United States Patent
Ito

(10) Patent No.: US 8,572,232 B2
(45) Date of Patent: Oct. 29, 2013

(54) IMAGE DISPLAY APPARATUS AND CONTROL METHOD

(75) Inventor: Yuki Ito, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/609,982

(22) Filed: Sep. 11, 2012

(65) Prior Publication Data
US 2013/0002623 A1 Jan. 3, 2013

Related U.S. Application Data

(63) Continuation of application No. 12/968,971, filed on Dec. 15, 2010, now Pat. No. 8,285,831.

(30) Foreign Application Priority Data

Dec. 22, 2009 (JP) .................................. 2009-290173

(51) Int. Cl.
*G06F 15/173* (2006.01)

(52) U.S. Cl.
USPC ............................ 709/223; 709/203; 709/220

(58) Field of Classification Search
USPC .......................... 709/223, 203, 220, 217–219
See application file for complete search history.

(56) References Cited

U.S. PATENT DOCUMENTS

| | | | | |
|---|---|---|---|---|
| 8,285,831 B2* | 10/2012 | Ito | ............................... | 709/223 |
| 2003/0034989 A1 | 2/2003 | Kondo | | |
| 2005/0273508 A1 | 12/2005 | Humpleman et al. | | |
| 2005/0285714 A1 | 12/2005 | Hirose et al. | | |
| 2005/0285848 A1* | 12/2005 | Fukuda | .......................... | 345/204 |
| 2006/0284867 A1 | 12/2006 | Ishikawa et al. | | |
| 2007/0027959 A1 | 2/2007 | Harris et al. | | |
| 2007/0037522 A1 | 2/2007 | Liu et al. | | |
| 2007/0061700 A1* | 3/2007 | Kothari et al. | ................ | 715/505 |
| 2009/0239587 A1 | 9/2009 | Negron et al. | | |
| 2009/0254778 A1 | 10/2009 | Huang et al. | | |
| 2010/0128231 A1* | 5/2010 | Furui | .............................. | 353/70 |

FOREIGN PATENT DOCUMENTS

| | | |
|---|---|---|
| JP | 2005-025126 A | 1/2005 |
| JP | 2006-165867 A | 6/2006 |
| JP | 2007-114888 A | 5/2007 |

OTHER PUBLICATIONS

Fukuda, Tadao, "Content creation tool for mobile phones", Nikkei Internet Technology, pp. 148-155, 2001.

* cited by examiner

*Primary Examiner* — Philip B Tran

(57) ABSTRACT

A communication unit that communicates with an information terminal; a control unit that controls the image display unit that displays an image; a storage unit that stores model data defining a model of web screen information for instructing the control of the display unit; and a transmitter that transmits the web screen information for display in the information terminal by obtaining the model data and a control item that controls the display unit based on a request signal for the web screen information received from the terminal, and by configuring in the model an instruction unit for instructing the control item. The control unit controls the control item of the display unit based on an instruction signal received from the information terminal as a result of specifying the instruction unit of the web screen information displayed in the terminal.

11 Claims, 3 Drawing Sheets

IMAGE DISPLAY APPARATUS AND CONTROL METHOD

CROSS-REFERENCE TO RELATED APPLICATIONS

This application is a continuation of, and claims priority under 35 U.S.C. §120 on, U.S. application Ser. No. 12/968,971, filed on Dec. 15, 2010, now U.S. Pat. No. 8,285,831 which claims priority under 35 U.S.C. §119 on Japanese patent application no. 2009-290173, filed on Dec. 22, 2009. The content of each such related application is incorporated by reference herein in its entirety.

BACKGROUND

1. Technical Field

The present invention relates to image display apparatuses and control methods.

2. Related Art

Thus far, it has been necessary, when operating an information device or the like through a network, for a remote controller that operates the information device to know, in advance, information regarding the information device that is to be operated, such as the communication protocol for sending operation signals, the meaning of the operation signals, the procedures for transmitting the operation signals themselves, operation range information, information regarding procedures for processing feedback signals from the device, and so on.

In other words, it has been necessary for the remote controller to include an operation application for configuring an interface including layout information that corresponds uniquely to the information device that is to be operated. Accordingly, because operation applications cannot be added to or switched in a simple remote controller, there have been cases where it is necessary to prepare as many remote controllers as there are types of information devices.

Meanwhile, generic remote controllers that can be used with multiple information devices are in practical use. However, in the case where operation applications are incorporated into such remote controllers in advance, only functions that are shared among manufacturers can be operated. On the other hand, with learning type remote controllers, it is necessary to learn the radio waves that are to be used for communication, and thus configuring such remote controllers has been troublesome.

Remote operation terminal apparatuses such as that disclosed in JP-A-2007-114888 have been proposed in order to solve this problem. This remote operation terminal apparatus is an apparatus that implements remote operation using a network and the remote operation terminal apparatus realizes a remote controller by collecting information of information devices using a dedicated application and combining that information with a template prepared in advance.

However, with aforementioned remote operation terminal apparatus, it is necessary to install a dedicated application and provide a function for combining the collected information of the information devices with the pre-prepared template in advance, and thus it has not been possible to cause typical information terminals that do not include such functions to operate as such a remote operation terminal apparatus.

SUMMARY

It is an advantage of some aspects of the invention to provide an information terminal capable of connecting to a network configured to function as a remote controller. Having been conceived in order to solve at least some of the aforementioned problems, the invention can be implemented as the following aspects or application examples.

FIRST APPLICATION EXAMPLE

An image display apparatus according to a first aspect of the invention is connected to an information terminal having a web client function via a network and that includes a web server function. The apparatus comprises a communication unit that communicates with the information terminal; an image display unit that displays an image; a control unit that controls the image display unit; a storage unit that stores model data defining a model of web screen information for instructing the control of the image display unit; and a transmitter that transmits the web screen information that can be displayed in the information terminal by obtaining the model data and a control item that controls the image display unit based on a request signal for the web screen information received from the information terminal, and by configuring in the model an instruction unit for instructing the control item. The control unit controls the control item of the image display unit based on an instruction signal received from the information terminal as a result of specifying the instruction unit of the web screen information displayed in the information terminal.

According to this configuration, the image display apparatus that includes the web server function obtains, based on the request signal received from the information terminal having the web client function, the model data and the control item that controls the image display unit, transmits the web screen information that can be displayed in the information terminal. In the case where an instruction has been made through the instruction unit in the web screen information displayed in the information terminal, an instruction signal is from the information terminal, and thus the image display apparatus can control the control item of the image display unit based on the instruction signal. Accordingly, the information terminal having the web client function can be caused to control the image display apparatus via the network.

SECOND APPLICATION EXAMPLE

In the image display apparatus according to the above aspect, the generation unit may select the model data and the control item based on user agent information included in the request signal.

THIRD APPLICATION EXAMPLE

In the image display apparatus according to the above aspect, it is preferable for the control unit to not accept instruction signals sent from an apparatus aside from the information terminal during a predetermined amount of time that starts when the instruction signal from the information terminal has been received.

According to such a configuration, processing can be carried out exclusively because instruction signals sent from other apparatuses are not accepted during the predetermined amount of time following the reception of an instruction signal from the information terminal.

FOURTH APPLICATION EXAMPLE

A control method of an image display unit according to a fourth aspect of the invention is for controlling, over a network, an image display apparatus that has a web server function used with an information terminal that has a web client function. The method comprises obtaining model data of web screen information that controls the image display apparatus stored in the image display apparatus and a control item that controls the image display unit, based on a request signal from the information terminal; and transmitting the web screen information by configuring, in the model indicated by the model data, an instruction unit for instructing the control item that controls the image display apparatus to the information terminal so that the web screen information is displayed in the information terminal. In the case where the instruction unit of the web screen information in the information terminal is specified, further operations include receiving, from the information terminal, an instruction signal in accordance with the instruction unit; and controlling the control item based on the instruction signal transmitted by the information terminal.

According to this method, the image display apparatus that includes the web server function obtains, based on the request signal received from the information terminal having the web client function, the stored model data and the control item for control, transmits the web screen information that can be displayed in the information terminal. In the case where an instruction has been made through the instruction unit in the web screen information displayed in the information terminal, an instruction signal is received from the information terminal in accordance with the instruction unit, and thus the image display apparatus can control the control item of the image display apparatus based on the instruction signal. Accordingly, the information terminal having the web client function can be caused to control the image display apparatus via the network.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projector apparatus serving as an image display apparatus will be described with reference to the drawings.

Embodiment

Figure 1:
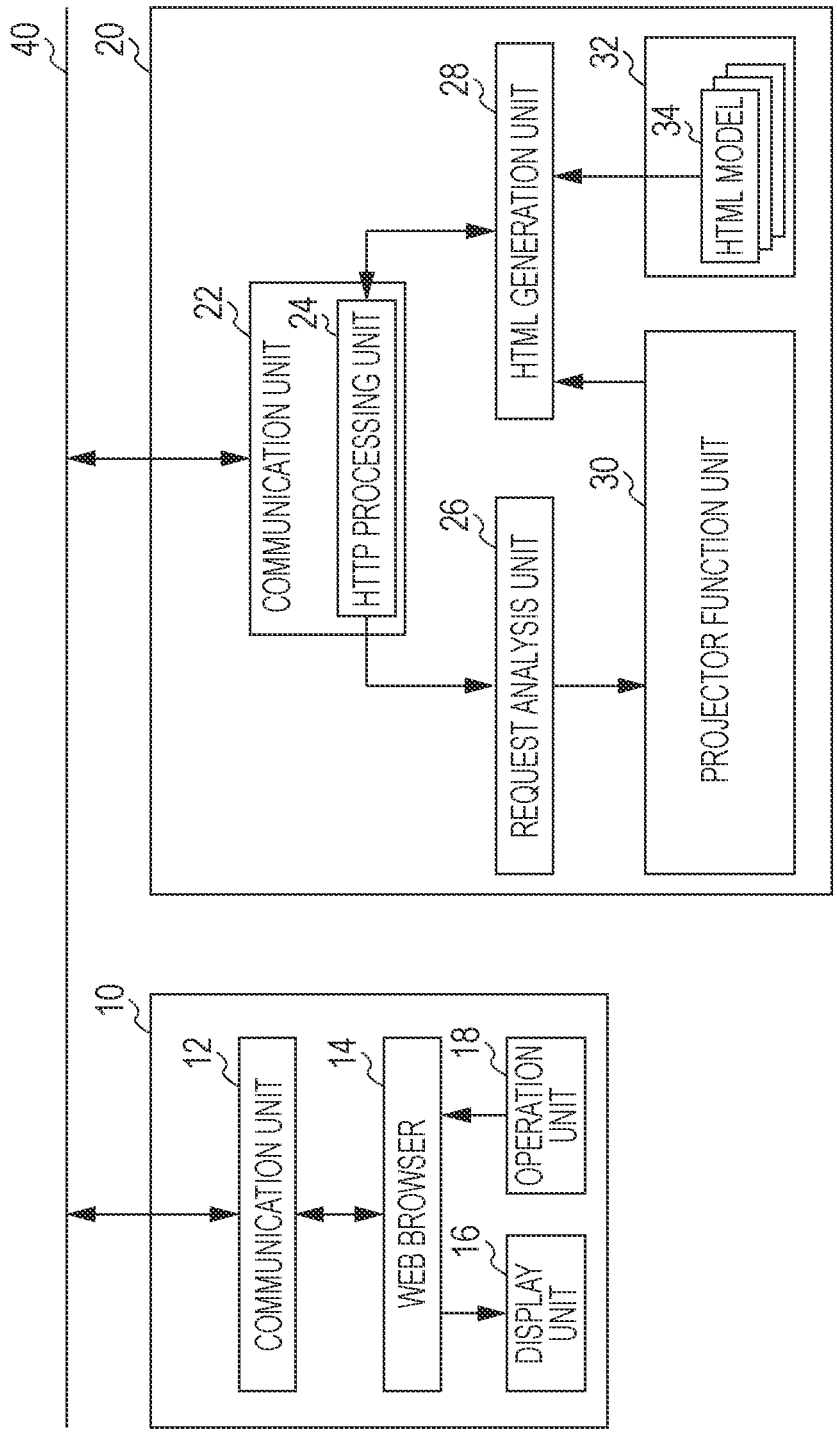
FIG. 1 is a block diagram illustrating a projector apparatus and a remote apparatus connected to a network, according to an embodiment of the invention.

FIG. 1 is a block diagram illustrating a remote apparatus 10, which is an information terminal that has a web client function, and a projector apparatus 20, which is an image display apparatus, connected to a network 40. In this embodiment, it is assumed that the remote apparatus 10 is a mobile telephone, a mobile information terminal, a personal computer, or the like. Meanwhile, the projector apparatus 20 is a network device that is connected to the network 40, and functions as a web server capable of transmitting information over the World Wide Web (WWW) via the network 40. Note that the projection format of the projector apparatus 20 may be any format, such as a liquid crystal format, DLP (Digital Light Processing) format, or the like. The remote apparatus 10 and the projector apparatus 20 include communication units 12 and 22, respectively. The communication units 12 and 22 transmit and receive information using a layer-based protocol such as the OSI (Open Systems Interconnection) reference model. Meanwhile, it is assumed that the network 40 is the Internet, an intranet, or the like.

The remote apparatus 10 includes the communication unit 12, a web browser 14, a display unit 16, and an operation unit 18. Meanwhile, the projector apparatus 20 includes the communication unit 22, a request analysis unit 26, an HTML (Hypertext Markup Language) generation unit 28, a projector function unit 30, and a storage unit 32. In addition, the communication unit 22 includes an HTTP (Hypertext Transfer Protocol) processing unit 24 serving as an application-layer communication service.

First, the functional units of the remote apparatus 10 will be described. The web browser 14 is a software application for browsing web pages; the web browser 14 generates, in response to a user specifying a URL (Uniform Resource Locator), a request to which a user agent header including a user agent has been added, and transmits that request to the specified web server over the Internet or the like. The web browser 14 then obtains HTML information generated by the web server in response to that request, analyzes the layout thereof, and displays a form based on the HTML information in the display unit 16.

Note that in this embodiment, the request mentioned here is assumed to generate a remote controller application that is capable of controlling the projector apparatus 20. Although the remote controller application is not shown here, the application includes an instruction unit such as a button controller or the like serving as a user interface, and controls the starting and stopping of projection, various types of corrections such as trapezoidal distortion correction, and so on. The remote apparatus 10 also generates instruction data corresponding to the remote controller application as a result of the user operating the operation unit 18, and transmits the data to the web server. The web browser 14 is capable of running software written in JavaScript™ and the like. It should be noted that the remote controller application loaded by the web browser 14 may be deleted in the case where a termination instruction has been received from the user, a predetermined amount of time has elapsed according to a timer, and so on.

Next, the functional units of the projector apparatus 20 will be described. The HTTP processing unit 24 obtains the agent information from the request sent by the remote apparatus 10, and instructs the request analysis unit 26 to analyze the request based on the obtained agent information. In this case, the projector apparatus 20 may be caused to be exclusively controlled by the remote apparatus 10, and not accept requests from other apparatuses. If such is the case, a configuration in which the projector apparatus 20 carries out exclusive processing for a predetermined amount of time upon the request sent by the remote apparatus 10 being received can be considered. Furthermore, the projector apparatus 20 may include a unit for notifying other remote apparatuses 10 that the exclusive processing has ended when the exclusive processing has ended.

The request analysis unit 26 functions as a control unit that analyzes the request sent by the remote apparatus 10 and controls the projector function unit 30. In this embodiment, in the case where the request includes query information, the request analysis unit 26 analyzes that query information and sends control signals to the projector function unit 30 based on the results of the analysis.

The projector function unit 30 is an example of an image display unit, and includes a function for displaying an image by enlarging and projecting an image formed based on inputted image data; in the case where control signals have been received from the request analysis unit 26, the operations of the projector function unit 30 are controlled based on those control signals. Furthermore, in the case where a request to generate the remote controller application has been received, the projector function unit 30 obtains command information regarding control items that can be controlled by the projector apparatus 20, and sends the obtained command information to the HTML generation unit 28.

Based on the user agent information, the HTML generation unit 28 selects a single HTML model 34, which is model data defining the model of the remote controller application and which has been stored in advance in the storage unit 32, and configures an instruction unit in the selected HTML model 34 based on the command information sent by the projector function unit 30; the HTML generation unit 28 then generates web screen information (HTML information) that functions as the remote controller application and sends that information to the HTTP processing unit 24. Note that the web screen information of the remote controller application may include descriptions written using a script language such as JavaScript™ or the like. A format that employs a Java™ applet can also be considered. Furthermore, the HTML model 34 may be stored in a ROM 72 (see FIG. 2), or may be sequentially added to a storage device 80 such as a flash memory (see FIG. 2) in accordance with each remote apparatus 10. The HTTP processing unit 24 returns the HTML information generated by the HTML generation unit 28 to the remote apparatus 10 as a response.

Figure 2:
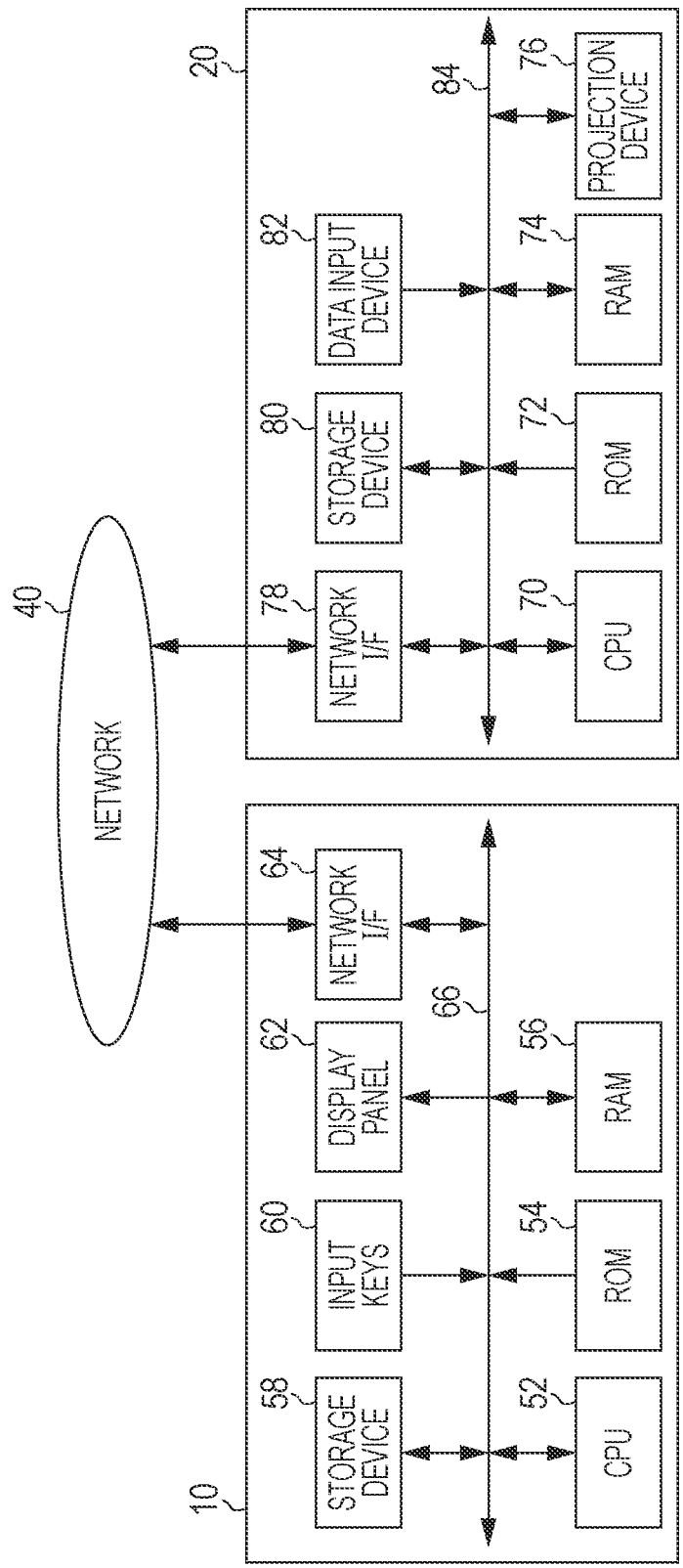
FIG. 2 is a diagram illustrating the hardware configurations of a projector apparatus and a remote apparatus.

FIG. 2 is a diagram illustrating the hardware configurations of the remote apparatus 10 and the projector apparatus 20. The remote apparatus 10 includes a CPU (Central Processing Unit) 52, a ROM (Read-Only Memory) 54, a RAM (Random Access Memory) 56, a storage device 58, input keys 60, a display panel 62, and a network I/F (interface) 64; these constituent elements are connected via a bus 66. Meanwhile, the projector apparatus 20 includes a CPU 70, the ROM 72, a RAM 74, a projection device 76, a network I/F 78, the storage device 80, and a data input device 82; these constituent elements are connected via a bus 84. The functions of the functional elements illustrated in FIG. 1 are realized by the hardware illustrated in FIG. 2 operating cooperatively with that software.

Figure 3:
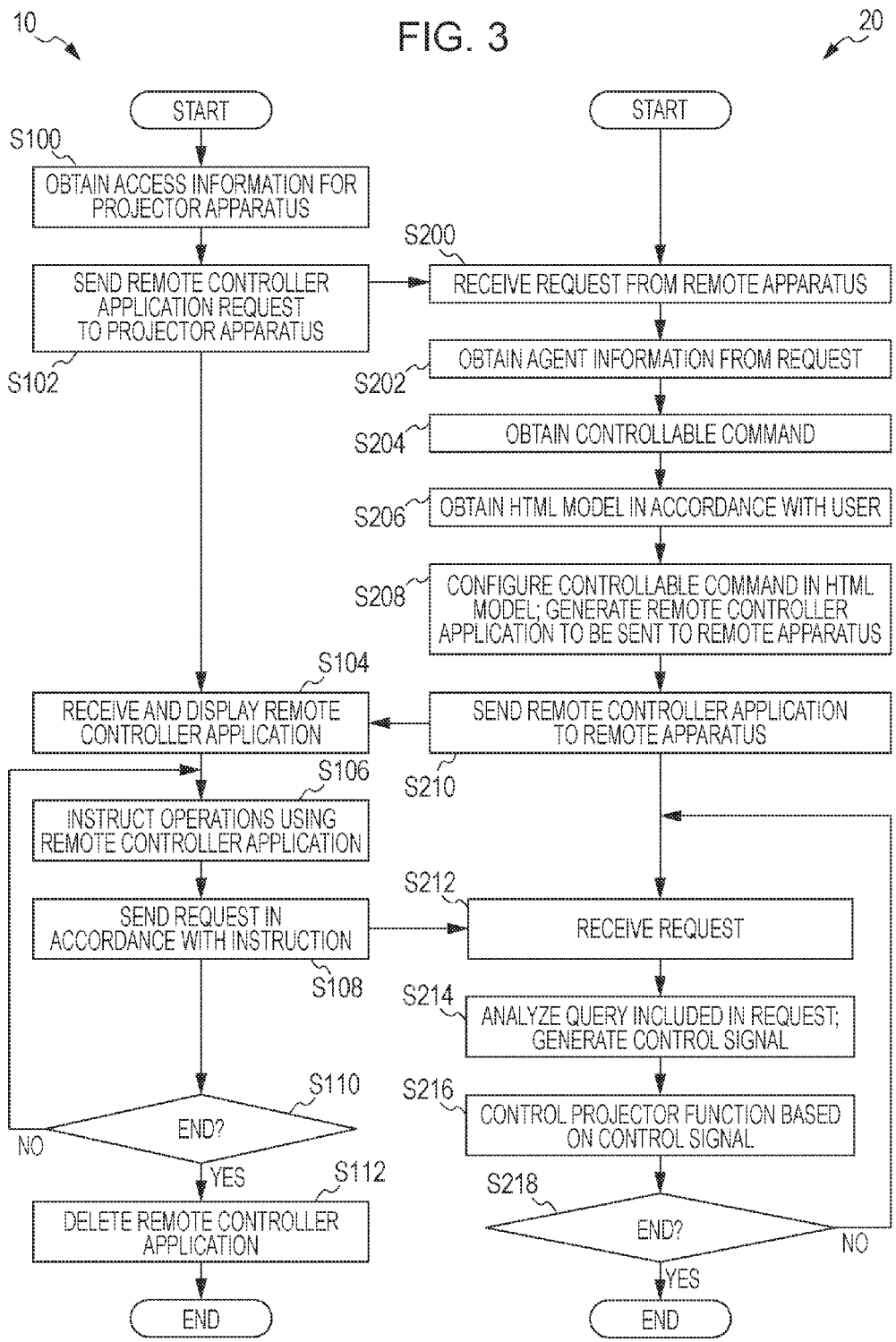
FIG. 3 is a flowchart illustrating a flow of processing by which a remote apparatus controls a projector apparatus.

Next, FIG. 3 is a flowchart illustrating a flow of processing by which the remote apparatus 10 controls the projector apparatus 20. First, the remote apparatus 10 obtains access information for the projector apparatus 20 from a barcode, a non-contact smartcard, or the like (step S100). Then, the remote apparatus 10 sends a remote controller application request (request signal) to the projector apparatus 20 based on the obtained access information (step S102).

Next, the projector apparatus 20 receives a request from the remote apparatus 10 (step S200). Then, the projector apparatus 20 obtains the agent information from the request (step S202). Furthermore, the projector apparatus 20 obtains commands capable of controlling the projector function unit 30 at the present point in time (step S204).

Next, the projector apparatus 20 obtains the HTML model 34 from the storage unit 32 in accordance with the user (step S206), and generates the remote controller application in which the controllable commands are configured in the obtained HTML model 34 (step S208).

Then, the projector apparatus 20 sends the generated remote controller application to the remote apparatus 10 (step S210).

Next, the remote apparatus 10 receives the remote controller application and displays the remote controller application in the display unit 16 (step S104). Then, the remote controller application is operated by the user, and an instruction is made to the projector apparatus 20 (step S106).

Continuing on, the remote apparatus 10 generates a request (instruction signal) in accordance with the instruction and sends that request to the projector apparatus 20 (step S108). Then, the remote apparatus 10 determines whether or not the operation of the projector apparatus 20 has been instructed to stop (step S110); in the case where the operation has not been instructed to stop (No in step S110), the process returns to step S106, where the system stands by for the user to operate the remote controller application. On the other hand, in the case where the operation has been instructed to stop (Yes in step S110), the remote apparatus 10 deletes the remote controller application (step S112), and the series of processes ends.

Meanwhile, the projector apparatus 20 receives the request sent by the remote apparatus 10 in step S108 (step S212). Then, the projector apparatus 20 analyzes the query contained in the request and generates a control signal (step S214), sends the generated control signal to the projector function unit 30, and controls the projector function (step S216).

Next, the projector apparatus 20 determines whether or not the remote apparatus 10 has instructed the end of operation (step S218); in the case where the operation has not been instructed to end (No in step S218), the process returns to step S212, where the projector apparatus 20 stands by for a request from the remote apparatus 10. On the other hand, in the case where the operation has been instructed to stop (Yes in step S218), the projector apparatus 20 ends the series of processes.

Through the aforementioned processing, a remote controller application in which usable commands are configured is sent to the remote apparatus 10, which is originally not the remote controller for the projector apparatus 20; a user can control the projector apparatus 20 by operating the remote apparatus 10, and thus the projector apparatus 20 can be controlled using a variety of information processing apparatuses. Furthermore, because the usable commands are determined when the remote controller application is generated, commands that are based on the configuration of the projector apparatus 20 are displayed in the remote controller application, making it possible to provide, to the user, a remote controller that is easy to use. Furthermore, because the remote controller application is deleted from the remote apparatus 10 after the remote controller application has been used, it is possible to make efficient use of the resources of the remote apparatus 10, such as the memory and the like.

Although an embodiment of the invention has been described with reference to the drawings, the specific configuration thereof is not intended to be limited to this embodiment, and various alterations, variations, and the like are possible without departing from the essential spirit of the invention. For example, although the projector apparatus 20 is employed as the image display apparatus, the image display apparatus is not limited thereto, and may instead be a television apparatus or the like.

Furthermore, the apparatuses that execute the aforementioned methods may be realized by single, independent apparatus, or may be realized by a combination of multiple apparatuses; all such forms are considered to fall within the scope of the invention.

What is claimed is:

1. An image display apparatus having a web server function that is connected via a network to an information terminal having a web client function, the image display apparatus comprising:
a communication unit that communicates with the information terminal;
an image display unit that displays an image;
a control unit that controls the image display unit;
a storage unit that stores model data defining a model of web screen information that is displayable in the information terminal, the web screen information including an interface for instructing the control of the image display unit; and
a transmitter that responds to a request signal for screen information from the information terminal by obtaining web screen information based on the model data and command information of a control item that controls the image display unit, wherein the model data is configured to include an instruction unit for instructing the control item, and transmitting the obtained web screen information to the information terminal;
wherein the control unit controls the control item of the image display unit based on an instruction signal received from the information terminal as a result of specifying the instruction unit of the web screen information displayed in the information terminal, and
wherein the web screen information is configured to be deleted from the information terminal in response to the information terminal sending an instruction signal to stop operation of the image display apparatus.

2. The image display apparatus according to claim 1, wherein the image display apparatus is a projector, the instruction unit comprises a button controller as part of the user interface and controls the starting and stopping of projection of the projector.

3. The image display apparatus according to claim 1, wherein the instruction unit controls trapezoidal distortion correction.

4. The image display apparatus of claim 1, wherein the web screen information defined within the display apparatus and transmitted to the information terminal, constitutes a remote controller for the image display unit and provides remote control of the image display unit from the information terminal via the network.

5. The image display apparatus of claim 1, wherein the web screen information transmitted to the information terminal is further configured to be deleted from the information terminal in response to a predetermined amount of time having elapsed according to a timer.

6. The image display apparatus of claim 1, wherein:
said information terminal is one of a plurality of different apparatuses on said network;
said model data is one of a plurality of model data sets stored within said storage unit, each of said model data sets corresponding to a different one of said apparatuses and defining a corresponding model of web screen information displayable on its corresponding apparatus;
said information terminal identifies itself as part of its request signal for web screen information; and
the model data defining the model of web screen information for the information terminal is selected from among the plurality of model data sets according to the identification of the information terminal.

7. The image display apparatus of claim 1, wherein:
said image display apparatus responds to communication signals only from said information terminal as long as the web screen information is installed in the information terminal; and
upon determining that the web screen information is being deleted from the information terminal, initiates response to communication signals from other apparatuses in addition to the information terminal.

8. The image display apparatus according to claim 1, wherein in response to transmitting the obtained web screen information to the information terminal, the control unit does not accept instruction signals sent from an apparatus aside from the information terminal during a predetermined amount of time that starts when the request signal for the web screen information was received from the information terminal.

9. A control method for controlling, over a network, an image display apparatus that has a web server function used with an information terminal that has a web client function, the method comprising:
responding to a request signal from the information terminal by obtaining model data defining a model of web screen information that controls the image display apparatus and command information of a control item that controls the image display apparatus, the model data being stored in the image display apparatus;
defining web screen information based on the model data and including an instruction unit for instructing the control item based on the command information of the control item, the defined web screen information including an interface that is displayable in the information terminal;
transmitting the defined web screen information to the information terminal;
wherein, in the case where the instruction unit of the web screen information in the information terminal is specified, the method further comprises receiving from the information terminal, an instruction signal in accordance with the instruction unit; and controlling the control item to adjust the image display apparatus based on the instruction signal transmitted from the information terminal; and
wherein the defined web screen information is configured to be deleted from the information terminal in response to the information terminal sending an instruction signal to stop operation of the image display apparatus.

10. A system for controlling, over a network, an image display apparatus that has a web server function using an information terminal that has a web client function, the system comprising:
one or more components within the image display apparatus configured to:
respond to a request signal from the information terminal by obtaining model data defining a model of web screen information that controls the image display apparatus and command information of a control item that controls the display settings of the image display apparatus, the model data being stored in the image display apparatus; and
defining web screen information based on the model data and including an instruction unit for instructing the control item based on the command information of the control item, the defined web screen information including an interface that is displayable in the information terminal;

wherein, in the case where the instruction unit of the web screen information in the information terminal is specified, the one or more components are further configured to receive from the information terminal, an instruction signal in accordance with the instruction unit; and control the control item to adjust the image display apparatus based on the instruction signal transmitted from the information terminal; and wherein the defined web screen information is further configured to be deleted from the information terminal in response to the information terminal sending an instruction signal to stop operation of the image display apparatus.

11. The system according to claim 10, wherein, in the case where the instruction unit of the web screen information in the information terminal is specified, the one or more components are configured to delete the instruction unit.

* * * * *